United States Patent [19]

Lowey, deceased

[11] 3,948,364

[45] Apr. 6, 1976

[54] SINGLE MIXTURE METALLIC BRAKE OR CLUTCH PLATE

[75] Inventor: Francis J. Lowey, deceased, late of Medina County, Ohio, by Old Phoenix National Bank, executor

[73] Assignee: Friction Products Co., Medina, Ohio

[22] Filed: July 10, 1974

[21] Appl. No.: 487,298

Related U.S. Application Data

[63] Continuation of Ser. No. 335,083, Feb. 28, 1973, abandoned.

[52] U.S. Cl. ................... 188/251 R; 192/107 M
[51] Int. Cl.² ........................................ F16D 69/00
[58] Field of Search .......... 188/251 R, 251 M, 73.2, 188/218 XL; 192/107 M, 70.14

[56] References Cited
UNITED STATES PATENTS

| | | | |
|---|---|---|---|
| 2,470,269 | 5/1949 | Schaefer | 188/251 M |
| 2,966,737 | 1/1961 | Spokes et al. | 188/251 M |
| 3,318,423 | 5/1967 | Dunki | 188/251 M |
| 3,802,849 | 4/1974 | Kimura et al. | 192/107 M |

*Primary Examiner*—Trygve M. Blix
*Assistant Examiner*—Charles E. Frankfort

[57] ABSTRACT

A disc-like brake or clutch component suitable for being carried in non-rotatable fashion by one of two relatively rotatable members of a brake or clutch and having relatively porous axially protruding spaced sectors for receiving abrasion carried between and integral with spaced spokes of a wheel-like relatively non-porous carrying member of much higher density than said sectors is prepared from a single powdered metal mixture, by placing two different thicknesses of metal powder in portions of a mold for powdered compressing powdered metal portions of greater thickness being joined by portions of lesser thickness and compressing the portions of lesser thickness with a pressure about 40 to 50 or more Tsi and compressing the portions of greater thickness with a lesser pressure of about 5 to 15 or 20 Tsi to produce a preform and then sintering said preform in a reducing or inert atmosphere under a moderate pressure of the order of 200 to 500 Psi and at a temperature of about 1,500° to 1,900° F. in the case the powder mixture contains substantial copper and at a temperature of 1,900 to 2,200° F. when the metal powder is substantially entirely iron.

5 Claims, 9 Drawing Figures

SINGLE MIXTURE METALLIC BRAKE OR CLUTCH PLATE

This application is a continuation of prior application Ser. No. 335,083, filed on Feb. 28, 1973, and now abandoned.

This invention relates to clutch and/or brake components that are entirely made from a single mixture of powdered metal base composition but has spaced portions of greatly different densities. It particularly relates to disc-like clutch and/or brake components having elevated friction or wearing surfaces that are relatively porous disposed as spaced segments of a disc and having intervening portions, as well as inner and outer annular portions of dense, relatively non-porous metal, formed of the same composition as that constituting the wearing surfaces.

In the ordinary clutch and brake components, the frictional and/or wearing surfaces adapted to take and provide the brake and frictional effects are composed of compressed and sintered powdered metal base compositions which are adhered either by rivets or by fusion bonding techniques to a disc formed of solid steel. The differences between the co-efficients of expansion and the coefficients of thermo conductivity of the diverse metals in the usual compositions cause stresses that promulgate warping when excessive energy is absorbed. Also the labor cost and production difficulties involved in separately forming frictional elements and then bonding such elements to opposite sides of the stronger steel disc whose sole function is to act as a carrier and heat sink for the segments is very substantial.

It is an object of the present invention to provide a clutch plate to be carried in a non-rotatable fashion by one or two relatively rotatable members, which clutch plate is formed entirely from a single mixture of powdered metal base composition.

A further object of the present invention is to provide a method of making a clutch and/or brake component, preferable of disc-like contour having wear-resisting segments carried on a relatively non-porous dense frame that may be non-rotatively attached to one of the two relatively rotatable members of a brake or clutch.

Other objects of the invention will be apparent from the following description of the invention as illustrated by the accompying drawing in which.

Figure 8:
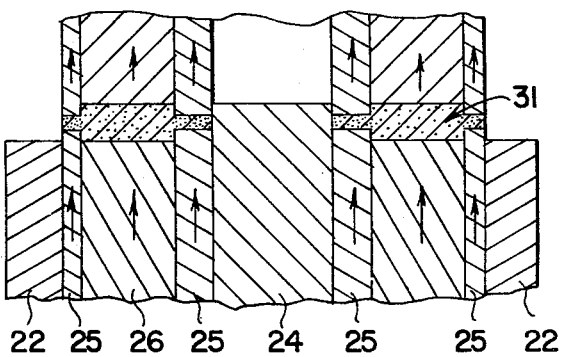
Figure 9:
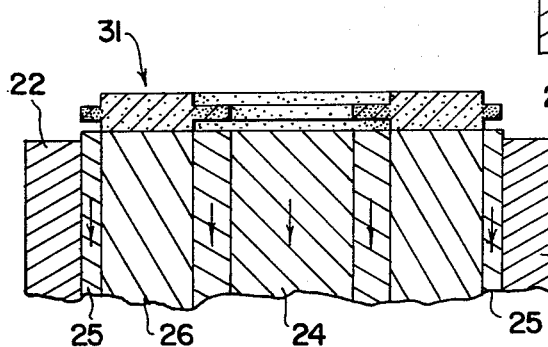

FIG. 8 shows a further progressive step in the molding operation wherein the molded but yet unsintered powder metal preform is in the process of being expelled from the mold; and, FIG. 9 is the further progressive stage showing a portion of the lower mold members with the compressed powdered metal disc-like preform in position so it can be simply removed for transfer to the usual type of sintering furnace (not shown).

Referring more particularly to the drawings in which like parts are designated by like numerals of reference throughout the several views, a clutch or brake component, A, or the present invention comprises a dense wheel-like portion having an outer peripheral portion 1 and a hub or central portion 4 connected by spokes 5. Means, such as the slots 2 in the periphery of the central opening 6 of the hub-portion 4 is provided for making non-rotatable connection to one of two relatively rotatable members of a clutch or brake assembly that may carry suitable splines on a hub or shaft (not shown) to cooperates with said slots 2.

Occupying the space between the spoke portions 5 and the dense peripheral portion 1 and the dense hub portion 4 of the disc-like or wheel-like carrying member is disposed a plurality of sectors 3 which are integrally formed of the same composition as that was used for forming the wheel-like carrying portion. The space sectors 3 are preferably of less density or more porous composition than the carrying portional. The increased porosity of the sector 3 is often desirable in the case of clutch plates for carrying lubricant. The pores thereof may be fusion filled or merely hot filled by rubbing with a chilled solid lubricant such as an extremely fine polytetrafluor ethylene powder, or they may be suitably impregnated with graphite or a graphite producing liquid, or with a silicone liquid, depending on properties desired. The hub portion 4 of the carrying member which is preferably more dense and more highly compressed than the wearing segments 3, is thus seen to be connected to the outer circumfrential portions 1 of the disc by the segments 3 as well as by the spoke portions 5 which separate the segments 3.

Figure 1:
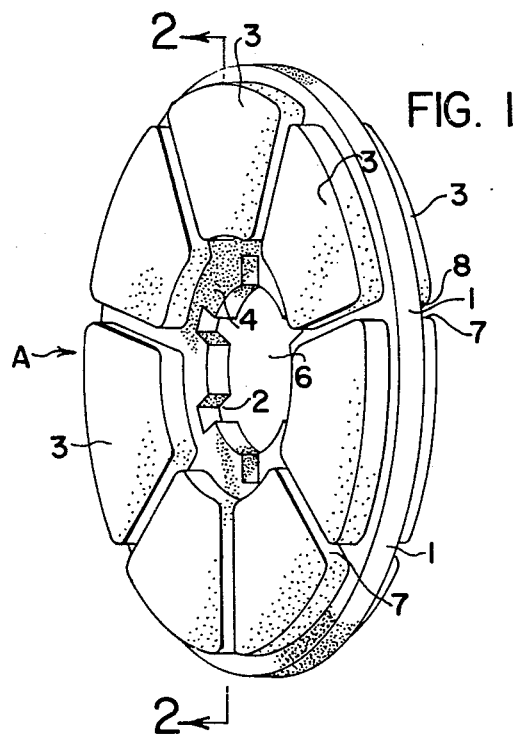
FIG. 1 is a perspective view of a clutch or brake component embodying the present invention.
Figure 2:
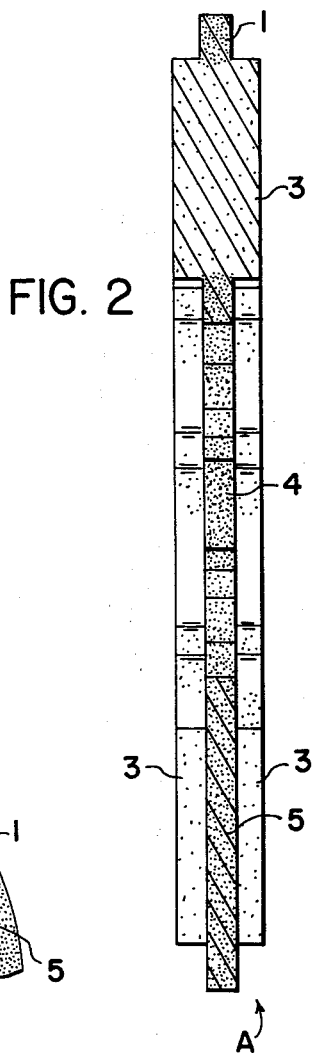
FIG. 2 is a sectional view through the component of FIG. 1 taken on the line 2—2 of FIG. 1.
Figure 3:
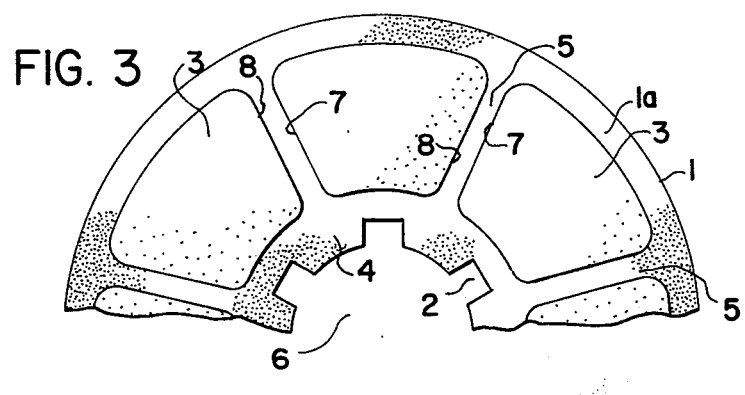
FIG. 3 is a side elevational view of a portion of the clutch plate or brake component of FIG. 1.
Figure 4:
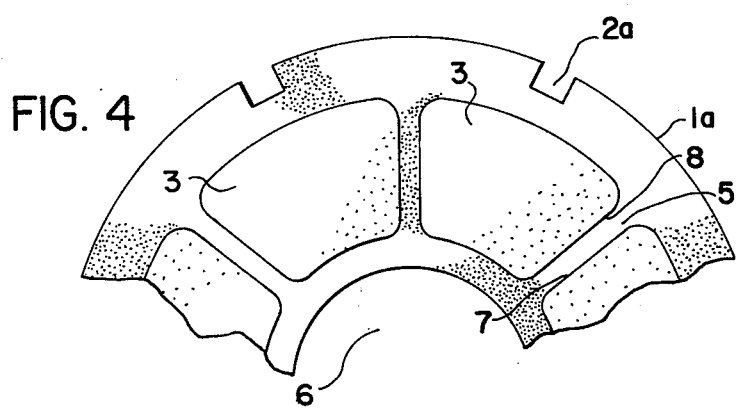
FIG. 4 is a side elevational view of a somewhat modified form of clutch plate embodying the present invention, wherein fastening means are provided at the outer periphery instead of at the periphery of the inner opening as shown in FIG. 1.

In the modification shown in FIG. 4, the outer peripheral portion 1a of the supporting more dense wheel-like carry-member is provided with means such as the slots 2a for attaching the clutch or brake component in non-rotatable manner to one or two rotatable members in non-rotatable fashion in a manner customary in the art.

The segments 3 adapted to take the abrasive wear are of much thicker section than the wheel-like central carrying portion and protrude axially outwardly from a face (preferable from both faces) of the central carrying portion. Between adjacent segments is thus provided generally radial channels defined by an axial surface of the spokes 5 and two axially extending side edges 7 × 8 of the adjacent segments 3.

Figure 5:
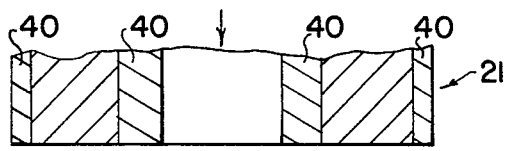
FIG. 5 is a sectional view through a portion of the mold members showing the powdered metal composition in the lower mold portion prior to any compression thereof.
Figure 6:
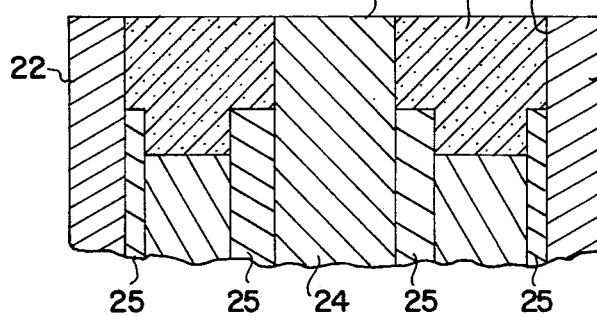
FIG. 6 is a similar view of the same mold members with the powdered metal therein at the start of the compression stroke.
Figure 7:
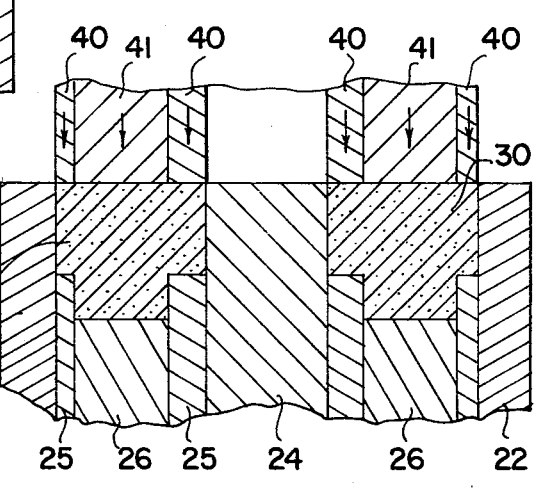
FIG. 7 is a similar view through a portion of the mold used for compressing the powdered metal with the powdered metal therein compressed to final shape.
Figure 7:
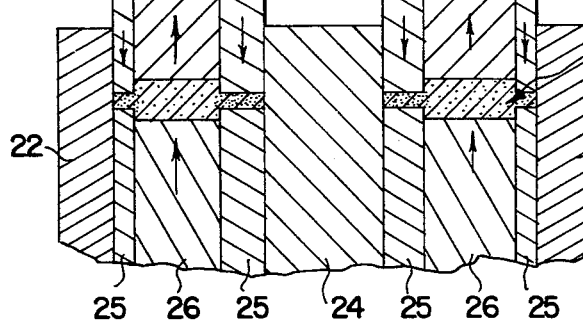

Referring more particularly to FIGS. 5 to 9, it may be seen that the die or mold for making the unsintered preform used in making the compressed products of the present invention comprises a bottom mold portion 20 is carried by one of the relatively movable components of a hydraulic press, for example, the frame and the upper mold portion 21 as carried by the opposite portion for example the ram. The lower mold portion 20 comprises the outer annular frame 22 portion of heavy gauge metal preferably steel. The outer frame portion 22 may be rigidly carried by the lower relatively movable press member and has an inner face 23 corresponding in cross-sectional size and shape to the outer circumference of the wheel-like central or carrying member 1 of the clutch or brake component, A, to be molded. A central aligning member 24 may also be rigidly carried by the lower relatively movable press member such as the frame (not shown) and is of a cross-sectional size and shape corresponding to the opening 6 of the molded preform to be made. Slidably carried axially in frame member 22 is a piston member 25 of a configuration corresponding to the more highly compressed wheel-like portions of the component including the central portion A, the spoke positions 5 and the outer or peripheral portion 1 or 1a. The piston member 25 may be spring biased or mounted on a separate hydraulic piston so that it normally occupies the position shown in FIGS. 5 and 6 of the drawing when the mold cavity is filled. Carried within the piston-like mold members 26 each having a cross-sectional configuration corresponding to the axial face of the less dense sectors 3 of the brake or clutch component, A. The piston mold members 26 are suitably spring biased or carried on a separately movable hydraulic piston so as to exert less compaction of the powder 30 in the mold cavity when the mold has exerted maximum compression on the powder 30 to form the compacted unsintered preform 31 as shown in FIG. 7.

The upper mold consists of the punch member 40 having the configuration of the piston 25 and axially slidably carried therein and spring biased to occupy the normal position shown in FIGS. 5 and 6, the upper piston mold members which comprises the pistons 41 which have the cross-sectional configuration corresponding to both the surface of the spaced segments 3 and the surface of the lower mold pistons 26. The spring bias on the upper piston mold member permits the maximum sliding movement with the punch member 40 of the piston portions 41 to be that corresponding to the height of the side walls 7 & 8 of the segments 3 in component, A. The strength of the bias spring is such that it will strip the preform from the upper mold portion 21 when the ram of the press is detached after the molding operation. The molding pressure applied between the opposite faces of the sectors 3 is preferably about 5 to 15 Tsi, although up to 30 Tsi may be used when less differences in density are desired.

The pressure applied to the more dense portion including the spokes, the central portion 6 and the rim portion 1a is preferably 40 to 50 or 60 Tsi. Even up to 100 Tsi may be used providing tools will stand such pressure.

The compressed (unsintered preform 31 is transferred to a suitable sintering furnace (not shown) and sintered in a reducing or inert atmosphere at a suitable sintering temperature such as 1,500° to 1,850° or 1,900° F. in the case of a copper base material or at a temperature of 2,000° to 2,200° F. in the case of an iron base powder. Pressure of about 200 to 500 Psi is usually applied to the entire surface of the preform during the sintering step whereupon a brake or clutch component as shown in FIG. 1 through 4 is obtained.

The following examples in which parts or percents are by weight illustrate the invention.

EXAMPLE I 100 parts of an iron powder having about 0.03% of carbon and a particle size such that 97 percent passes thru a 100 mesh screen is mixed with about 5 parts of copper powder passing thru a 200 mesh screen, 3 parts of the weight thereof of fine particle size granular silica and about 0.1% of the weight thereof of large particle size boron nitride, about 1 part of molybdenum disulfide and 5 parts of graphite. The powdered mixture is incorporated into a mold as shown in FIG. 5. The pressure applied to the wheel-like carrying portion by the pistons 25 and 40 is about 50 Tsi and that applied to the material of the spaced segments 3 is about 10 Tsi. The preform upon removing from the mold is sintered in a reducing atmosphere comprising $N_2$ & CO at about temperatures of 2,000° F. and under a pressure of 400 Psi for one hour. The sintered preform is removed after cooling in the furnace and may be used directly as a component, A.

EXAMPLE II

A mixture of the following is prepared.

| Material | Parts |
| --- | --- |
| Iron powder as in example I | 50 |
| Copper powder 95% passing a 200 mesh screen | 40 |
| Silica (fine granules) | 3 |
| Molybdenum disulfide | 1.0 |
| graphite (powder) | 5.0 |

The mixture thus produced is molded as in example I and the preform is sintered at 400 Psi for 1 hour at 1,800° F. A clutch plate having copper-iron alloy portions of differing density is thus obtained.

Generally, the preferred compositions for clutch components comprise about 70 to 98 parts of iron powder
2 to 25 parts of copper powder
1 to 8 parts of graphite
.2 to 2 parts of molybdenum sulfide
0.5 to 10 parts of fine granular abrasive powdered silicon carbide.

The compositions of the above examples and the pressures used in making the preform as well as sintering temperatures and pressures may be varied to obtain varying densities.

It is also apparent that in accordance with the provisions of the patent statutes, modifications of the invention may be made without changing the spirit thereof.

Having described my invention, I claim:

1. A friction component suitable for clutches and brakes having unitary portions of different densities composed of a single compressed and sintered powdered metal base compound, said component comprising a wheel-like carrying portion being in the condition as sintered and having a hub portion that has a central axis and outer peripheral portion connected to said hub portion through a plurality of spaced spokes, the outer peripheral portion and said spokes having opposite axial faces disposed respectively in planes spaced from each other and substantially perpendicular to said axis, a plurality of sectors of greater axial thickness than said carrying portion, each of said sectors being disposed in an area bounded by a pair of said spokes and said hub and peripheral portions and being integral therewith, each of said sectors occupying the space between two successive spokes and each having opposite axial faces in spaced planes that are substantially perpendicular to said axis and each of said sectors being substantially uniformly less dense and porous throughout than said carying portion, whereby pores in said sectors are adapted to receive and cary a lubricant.

2. The component of claim 1 wherein the powdered metal is principally a ferrous metal and the two axial faces of said sectors lie in two planes each perpendicular to the axis of the component and each spaced axially from the planes of the axial faces of said more dense wheel-like carrying portion.

3. The component of claim 2 wherein each of the two exposed axial faces of said sectors, which faces are to be subjected to frictional abrasion, lie in one of two parallel planes that are axially spaced from the planes of the axial faces of said spokes and the sintered material of said spokes has a density substantially that of the void free material of which it is formed.

4. The component of claim 2 wherein the metal powders in said composition contains a minor portion of copper powder and a major portion is iron powder.

5. The component of claim 4 wherein the copper powder is not appreciably more than 10% of the weight of the metal powders present.

* * * * *